United States Patent [19]
Peter

[11] Patent Number: 5,633,296
[45] Date of Patent: May 27, 1997

[54] METHOD FOR THE PRODUCTION OF RUBBER MIXTURES

[75] Inventor: Julius Peter, Dommayergasse 7, A-1130 Vienna, Austria

[73] Assignees: Julius Peter, Vienna, Austria; Continental Aktiengesellschaft, Hanover, Germany

[21] Appl. No.: 490,127

[22] Filed: Jun. 14, 1995

[30] Foreign Application Priority Data

Jun. 14, 1994 [DE] Germany ............... 44 20 543.0

[51] Int. Cl.$^6$ ..................... C08J 3/20
[52] U.S. Cl. ............ 523/344; 523/351; 523/348; 523/353; 366/83; 366/91; 366/97; 366/301

[58] Field of Search ................... 523/344, 351, 523/348, 353; 366/83, 91, 301, 97

[56] References Cited

U.S. PATENT DOCUMENTS 4,910,237  3/1990  Peter ..................... 523/351

*Primary Examiner*—Edward J. Cain
*Attorney, Agent, or Firm*—Robert W. Becker & Associates

[57] ABSTRACT

The method for manufacturing rubber mixtures includes the steps of plasticizing batchwise rubber in a first inner kneader to produce a batch of plasticized rubber and transporting the batch of plasticized rubber, while still hot, into a second inner kneader. In the second kneader nonreactive additives are mixed into the batch of plasticized rubber.

8 Claims, 2 Drawing Sheets

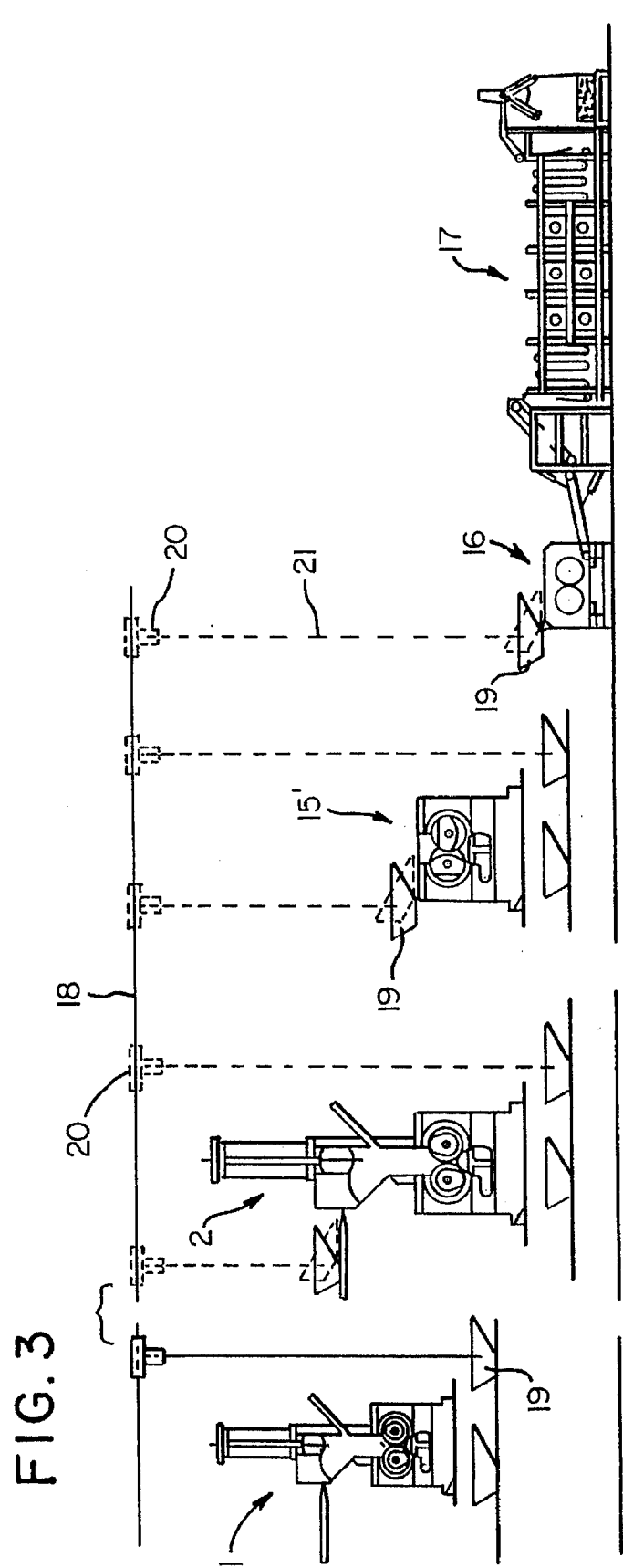

METHOD FOR THE PRODUCTION OF RUBBER MIXTURES

BACKGROUND OF THE INVENTION

The present invention relates to a method for the production of rubber mixtures with which the rubber is plasticized and/or masticated in an interior mixer (kneader) in batches and is treated with non-reactive additives; on the basis of the thus created basic mixture, the finished mixture is processed in batches by adding reactive additives.

In such a method, it is necessary to heat up the rubber in the first phase by supplying it with mechanical energy to such an extent that it becomes kneadable (plasticized) and capable of receiving the additives required for the development of its characteristic features, particularly the highly active fillers. In the second phase, the addition of the reactive additives follows.

The invention is based on the fact that the majority of rubber mixtures, particularly those for the production of pneumatic vehicle tires (for example, mixtures for tire treads, mixtures designed for adhering to steel and silica gel mixtures) contains high amounts of highly active fillers, and that it is required for the production of basic mixtures, i.e., mixtures which do not yet contain reactive additives, to carry out several mixing procedures in order to obtain kneadable basic mixtures which can be processed easily. Moreover, expensive ram kneaders are required for the production of basic mixtures, and they are usually provided with plasticizer injection pumps. For storing, transport and weighing of the fillers, the ram kneaders have to be provided with extensive additional devices, as well as with conveyance extruders for the additional processing of the basic mixtures which are often still tenacious.

Accordingly, the above-mentioned first phase of the production of the basic mixture is divided into two processing steps. In the first processing step, the rubber is heated up by kneading (plasticized or masticated), if necessary, homogeneous rubber blends are produced, respectively, natural rubber is broken down (masticated). In the second processing step, the highly active fillers, respectively, the nonreactive additives are added in the same inner mixer.

However, for all these processes, a basic mixture kneader is required which is very expensive in its initial costs, in order to be able to carry out plasticizing at relatively low rotation speeds of the rotors to prevent too high thermal stresses and non-homogeneities.

It is, therefore, an object of the present invention to suggest a method of the aforementioned kind which is comparably simpler and more economic.

SUMMARY OF THE INVENTION

The method for manufacturing rubber mixtures according to the present invention is primarily characterized by:

plasticizing batchwise rubber in a first inner kneader to produce a batch of plasticized rubber;

transporting the batch of plasticized rubber, while still hot, into a second inner kneader; and in the second kneader mixing into the batch of plasticized rubber non-reactive additives.

Preferably, the method further comprises the step of comminuting the rubber before introducing the rubber into the first inner kneader.

Advantageously, the method further comprises the step of adding degradation agents to the comminuted rubber.

In another embodiment of the present invention, the method further comprises the step of adding small amounts of non-reactive additives to the comminuted rubber for pre-distribution in the rubber during plasticizing.

In yet another embodiment of the present invention, the method further comprises the step of adding degradation agents to the comminuted rubber and the step of adding small amounts of non reactive additives to the comminuted rubber for pre-distribution in the rubber during plasticizing.

Preferably, a time period of a working cycle of the first inner kneader and a time period of a second inner kneader are substantially identical.

Expediently, a batch of rubber for the step of plasticizing is selected as a function of the desired rubber contents of the rubber mixture to be produced in the second inner kneader and the volume of the second inner kneader.

The present invention also relates to a method for manufacturing rubber mixtures for pneumatic vehicle tire production, wherein rubber is plasticized batchwise in a first inner kneader to produce a batch of plasticized rubber, the batch of plasticized rubber is transported, while still hot, into a second inner kneader, and in the second kneader nonreactive additives are mixed into the batch of plasticized rubber.

The present invention furthermore relates to a device for manufacturing rubber mixtures, wherein rubber is plasticized batchwise in a first inner kneader to produce a batch of plasticized rubber, the batch of plasticized rubber is transported, while still hot, into a second inner kneader, and in the second inner kneader nonreactive additives are mixed into the batch of plasticized rubber. The inventive device comprises a first inner kneader and a second inner kneader wherein the second inner kneader is a ram kneader.

The first inner kneader is preferably a ramless kneader, but it can also be a ram kneader. The ram-less kneader comprises two rotors and a closure having at least one projection extending into the wedge portion between the two rotors.

Expediently, the ram-less inner kneader has a charging opening and comprises a tamping device for the rubber coordinated with the charging opening.

The second inner kneader has an effective volume that is 5–100% greater than an effective volume of the first inner kneader. The effective volume of the second inner kneader is 20 to 50% greater than the effective volume of the first inner kneader.

Preferably, the device further comprises a device for transporting the rubber between the first and the second inner kneaders, the transporting device comprising at least one conveying trough for receiving the rubber.

The device for transporting is advantageously a circulating transport device.

The device for transporting includes a guiding device and the conveying trough is suspended from the guiding device so as to be liftable and lowerable. The guiding device is preferably a trolley. The conveying trough is expediently tiltable and comprises an inner nonstick lining.

The first and the second inner kneaders each have a charging opening and the conveying trough has an outlet opening that is smaller than the charging openings.

The outlet opening is narrower than the charging openings.

According to the invention, the rubber is plasticized and/or masticated in a first inner mixer from which the rubber, still hot, is conveyed into a second inner mixer in which the non-reactive additives, especially the highly active fillers, are added to the rubber.

The great advantage of this method, among others, is that the basic mixture ram kneader which is expensive in its initial costs and complicated in its construction, does not also have to carry out plasticizing and/or masticating, but its practically only task is to add the nonreactive additives, particularly, the highly active fillers.

Advantageously, plasticizing and/or masticating is carried out in the first interior mixer in batches with a rubber quantity that is selected as a function of the rubber contents of the mixture to be produced in the second inner mixer as well as with respect to the volume of the second inner mixer.

For the inventive method to be carried out, two inner mixers are used which are arranged sequentially, in particular, atop one another with the plasticized rubber to be guided on-line from one inner mixer to the other such that the rubber does practically not cool out, respectively, does not lose plasticity. The transport of the rubber in this context can be carried out by gravity and/or conveying means, in particular conveying troughs.

In order for a great quantity of additives to be added in the second processing step of the basic mixing process, a ram kneader is used in this phase, while an inner mixer, with or without a ram, can be employed in the first processing step.

The thus obtained mixture can subsequently be further processed as a basic mixture, can be remilled or directly processed further into a vulcanizeable mixture.

BRIEF DESCRIPTION OF THE DRAWINGS

The objects and advantages of the present invention will appear more clearly from the following specification in conjunction with the accompanying schematic drawings, in which:

FIG. 3 illustrates a further modified unit for the production of finished rubber mixtures in a schematic front view.

DESCRIPTION OF PREFERRED EMBODIMENTS

Figure 1:
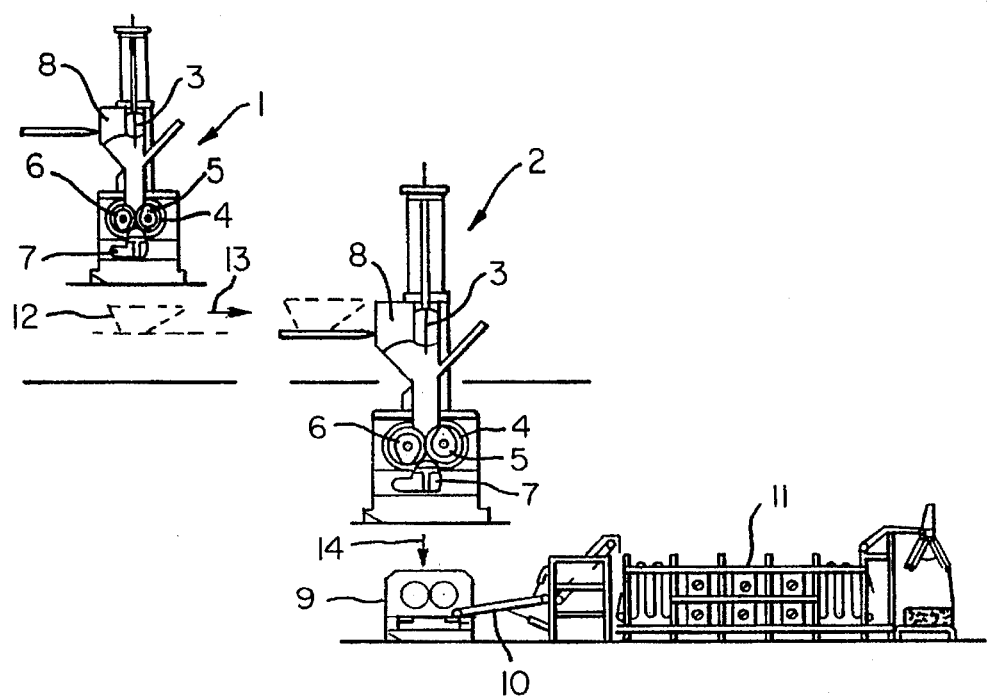
FIG. 1 illustrates a unit for the production of basic rubber mixtures in a schematic front view.
Figure 2:
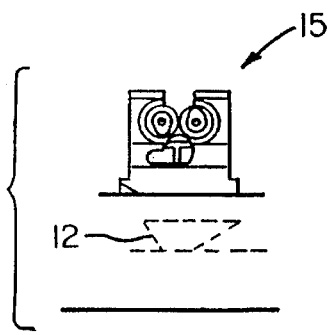
FIG. 2 illustrates an inner mixer in a schematic front view, in particular a unit for the production of rubber mixtures that is modified relative to FIG. 1.

In the embodiment according to FIG. 1, two ram kneaders 1, 2 (inner kneaders or mixers) are used which are vertically offset relative to each other, the ram kneader 2 being arranged at a lower level. Beneath their ram devices 3, both ram kneaders are provided with a mixing chamber 4 with herein arranged rotors 5,6 which rotate in opposite directions. The mixing chamber 4 is closed toward the bottom by a downwardly pivoting saddle 7. The charging opening of the two ram kneaders 1, 2 is indicated by reference numeral 8.

The two ram kneaders 1, 2 are dimensioned such that the effective volume (effective volumetric capacity) of the ram kneader 2 is larger by approximately 5%–100%, but especially larger by 20%–50%, compared to the effective volume of the ram kneader 1.

Below the ram kneader 2, a milling device 9 is positioned from which a conveyor belt 10 or the like lead to a batch-off unit 11.

For producing the basic mixture, the rubber is first fed into the ram kneader 1. Here, the rubber is heated by kneading (masticating) and plasticized, natural rubber is degraded (broken down) by mastication. After the completion of one charge, it is quickly and directly fed, without any significant cooling, into the ram kneader 2. This is carried out by a trough 12 which is movable toward the charging opening in the direction of arrow 13. It is understood that the trough 12 should possibly be dischargeable by a tilting motion. On starting the processing within the ram kneader 2, the desired, non-reactive fillers, respectively, highly active fillers are fed into the mixing chamber 4.

While one batch is being processed in the ram kneader 2, a new batch is fed into the ram kneader 1, in order to have both ram kneaders 1, 2 operate at the same time.

The finished basic mixture leaves the ram kneader 2 in the direction of arrow 14, it arrives at the milling device 9 and is finally conveyed into the batch-off unit 11. From then on, the basic mixture can be subjected to a finished mixing process by known means.

In order to be able to supply highly active fillers, the ram kneader 2 must be provided with a ram, whereas the ram kneader 1 can be substituted by a ram-less inner mixer 15 illustrated in FIG. 1. This exchange is possible because during the first step of basic mixing, no adding of fillers or the like occurs but only plasticizing, respectively, masticating.

The unit according to FIG. 3 provides for a further remilling of the basic mixture, the adding of a portion of the reactive materials or the production of a finished mixture. In this unit, like in the unit according to FIG. 1, the ram kneaders 1, 2 are also utilized for processing the basic mixture; the additionally provided ram-less inner mixer 15', however, serves the purpose of remilling or of adding the reactive additives. A milling device 16 is arranged downstream to this ram-less inner mixer 15', and downstream of it a batch-off unit 17 is positioned.

One peculiarity of this unit is that a circulating, continuous conveying path 18 is used at which trolley-like conveying troughs 20 are arranged and guided so as to be lifted and lowered. The trolleys arranged along the conveying path 18 (running rail or the like) are indicated by reference numeral 20. They should preferably be provided with a lifting apparatus for lifting and lowering the conveying troughs 19, i.e., be in the form of trolley hoists. The cable or ropelike supporting devices are indicated by reference numeral 21. Such a conveying unit as a connecting element between the stations of the mixing unit is particularly simple and reliable. With simple means it can be embodied such that the conveying troughs 19 can be tilted. In order to exclude to a great extent contamination of the conveying unit, the conveying troughs 19, respectively, 12 should be provided at their inner side with a nonstick coating, for example, Teflon or silicone resin. It is further advantageous to select the size of the outlet of the conveying troughs 19, respectively, 12 to be so narrow, respectively, so small that the outlet is smaller than the charging opening of the inner mixers to be supplied, particularly the ram-less interior mixer. Thus, a clean conveyance from the conveying means to the kneader, respectively, the inner mixer is achieved and the quality of the mixture is increased.

It may be added that the ram-less inner mixers can be provided with a flap or closure in the area of their charging opening. This flap is designed to exclude, respectively, reduce an unnecessary piling-up of the mixture material in the so-called wedge-shaped portion between the rollers of the mixing chamber, and, for this purpose, may be provided with one or more projections which extend into this portion between the two rotors of the inner mixer. This closure can, in a modified design, carry out a tamping action (if provided with a tamping device) by a movement in the direction toward the mixing chamber.

The invention does not exclude that, prior to the first step, in the basic mixing process, the rubber is milled and treated with degrading agents and/or with preferably small portions of the highly active fillers, in order that a predistribution of the additives, respectively, the fillers can be carried out.

In modification of the embodiment according to FIG. 3, the unit can also be used without the ram-less inner mixer 15', in which case the basic mixture—corresponding to FIG. 1—would have to be conveyed to the mill 16 from the ram kneader 2.

The present invention is, of course, in no way restricted to the specific disclosure of the specification and drawings, but also encompasses any modifications within the scope of the appended claims.

What I claim is:

1. A method for manufacturing rubber mixtures, said method comprising the steps of:

plasticizing batchwise rubber in a first inner kneader to produce a batch of plasticized rubber;

transporting the batch of plasticized rubber, while still hot, into a second inner kneader; and in the second kneader mixing into the batch of plasticized rubber nonreactive additives without allowing the batch of plasticized rubber to cool before mixing.

2. A method according to claim 1, further comprising the step of comminuting the rubber before introducing the rubber into the first inner kneader.

3. A method according to claim 2, further comprising the step of adding decomposition (degradation) agents to the comminuted rubber.

4. A method according to claim 2, further comprising the step of adding small amounts of non-reactive additives to the comminuted rubber for pre-distribution in the rubber during plasticizing.

5. A method according to claim 2, further comprising the step of adding decomposition (degradation) agents to the comminuted rubber and the step of adding small amounts of non reactive additives to the comminuted rubber for predistribution in the rubber during plasticizing.

6. A method according to claim 1, wherein a time period of a working cycle of the first inner kneader and a time period of a second inner kneader are substantially identical.

7. A method according to claim 1, wherein a batch of rubber for the step of plasticizing is selected as a function of the desired rubber contents of the rubber mixture to be produced in the second inner kneader and the volume of the second inner kneader.

8. A method for manufacturing rubber mixtures for pneumatic vehicle tire production, wherein rubber is plasticized batchwise in a first inner kneader to produce a batch of plasticized rubber, the batch of plasticized rubber is transported, while still hot, into a second inner kneader, and in the second kneader non-reactive additives are mixed into the batch of plasticized rubber.

* * * * *